United States Patent
Shiga et al.

(10) Patent No.: US 9,192,818 B2
(45) Date of Patent: Nov. 24, 2015

(54) GOLF BALL RESIN COMPOSITION AND GOLF BALL

(75) Inventors: Kazuyoshi Shiga, Kobe (JP); Ryo Murakami, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 399 days.

(21) Appl. No.: 13/543,448

(22) Filed: Jul. 6, 2012

(65) Prior Publication Data

US 2013/0012335 A1 Jan. 10, 2013

(30) Foreign Application Priority Data

Jul. 8, 2011 (JP) ................................. 2011-152216
Dec. 5, 2011 (JP) ................................. 2011-265617

(51) Int. Cl.
A63B 37/00 (2006.01)
C08K 5/521 (2006.01)
C08L 23/08 (2006.01)

(52) U.S. Cl.
CPC ......... *A63B 37/0003* (2013.01); *A63B 37/0024* (2013.01); *A63B 37/0033* (2013.01); *A63B 37/0039* (2013.01); *A63B 37/0048* (2013.01); *A63B 37/0051* (2013.01); *A63B 37/0061* (2013.01); *A63B 37/0062* (2013.01); *A63B 37/0064* (2013.01); *A63B 37/0065* (2013.01); *A63B 37/0073* (2013.01); *C08K 5/521* (2013.01); *A63B 37/0074* (2013.01); *A63B 37/0075* (2013.01); *A63B 37/0076* (2013.01); *C08L 23/0876* (2013.01)

(58) Field of Classification Search
None
See application file for complete search history.

(56) References Cited

U.S. PATENT DOCUMENTS

| | | | |
|---|---|---|---|
| 3,464,949 A * | 9/1969 | Wartman et al. | 524/244 |
| 5,306,760 A | 4/1994 | Sullivan | |
| 5,312,857 A | 5/1994 | Sullivan | |
| 5,700,890 A * | 12/1997 | Chou | 526/272 |
| 6,329,458 B1 | 12/2001 | Takesue et al. | |
| 2001/0018375 A1 | 8/2001 | Hayashi et al. | |
| 2002/0099120 A1 | 7/2002 | Takesue et al. | |
| 2003/0073517 A1 | 4/2003 | Ichikawa et al. | |
| 2010/0048327 A1 | 2/2010 | Bulpett et al. | |
| 2010/0063188 A1 * | 3/2010 | Keller et al. | 524/147 |

FOREIGN PATENT DOCUMENTS

| | | | |
|---|---|---|---|
| JP | 60014878 | * | 1/1985 |
| JP | 6-29274 A | | 10/1994 |
| JP | 2000-157646 A | | 6/2000 |
| JP | 2001-218873 A | | 8/2001 |
| JP | 2002-219195 A | | 8/2002 |
| JP | 2002-331048 A | | 11/2002 |
| JP | 2004-524418 A | | 8/2004 |
| JP | 2005-230454 A | | 9/2005 |
| JP | 2005-342532 A | | 12/2005 |
| WO | WO 94/24204 A2 | | 10/1994 |
| WO | WO 02/079319 A2 | | 10/2002 |

OTHER PUBLICATIONS

English translation of the Notice of Reasons for Rejection dated Jul. 28, 2015 for Japanese Application No. 2011-265617.

* cited by examiner

*Primary Examiner* — David Buttner
(74) *Attorney, Agent, or Firm* — Birch Stewart Kolasch & Birch, LLP

(57) ABSTRACT

An object of the present invention is to provide a soft golf ball resin composition excellent in the shot feeling and resilience. The present invention provides a golf ball resin composition comprising: (A) 100 parts by mass of at least one resin component selected from the group consisting of (a-1) a binary copolymer, (a-2) a binary ionomer resin, (a-3) a ternary copolymer, and (a-4) a ternary ionomer resin, (B) 1 part to 25 parts by mass of a phosphate ester and/or a salt thereof; and (C) 0 part to 200 parts by mass of a basic inorganic metal compound. The golf ball of the present invention comprises a constituent member formed from the golf ball resin composition.

19 Claims, 2 Drawing Sheets

GOLF BALL RESIN COMPOSITION AND GOLF BALL

FIELD OF THE INVENTION

The present invention relates to a golf ball resin composition and a golf ball using the same.

DESCRIPTION OF THE RELATED ART

As a golf ball construction, a one-piece golf ball comprising a golf ball body, a two-piece golf ball comprising a core and a cover, a three-piece golf ball comprising a core consisting of a center and a single-layered intermediate layer covering the center, and a cover covering the core, and a multi-piece golf ball comprising a core consisting of a center and at least two intermediate layers covering the center, and a cover covering the core are known. Ionomer resins are used as materials constituting each layer of golf balls. Use of the ionomer resins as the constituent member of the golf ball provides the golf ball traveling a great distance, because of its high stiffness. Accordingly, ionomer resins are widely used as a material constituting a cover or an intermediate layer of the golf ball.

Japanese Patent Publication No. 2000-157646 A discloses a golf ball cover composition having a melt index (MI) of 1 dg/sec. or more and primarily comprising a mixture of a base resin, blended with (d) a metal soap obtained by neutralizing an organic acid having up to 29 carbon atoms with a monovalent to trivalent metal ion, in a mass ratio of the base resin to the metal soap being 95:5 to 80:20, wherein the base resin comprises an ionomer resin component containing (a) a ternary ionomer resin consisting of a metal ion neutralized product of an olefin-unsaturated carboxylic acid-unsaturated carboxylate copolymer having an acid content of 12 wt % or less, and (b) a binary ionomer resin consisting of a metal ion neutralized product of an olefin-unsaturated carboxylic acid copolymer having an acid content of 15 wt % or less in a ratio of 40:60 to 100:0; and (c) an unneutralized random copolymer composed of an olefin and an unsaturated carboxylic acid monomer, in a mass ratio of the ionomer resin component to (c) the unneutralized random copolymer being 75:25 to 100:0.

U.S. Pat. No. 5,306,760 discloses a golf ball comprising a core and a cover, wherein the cover consists essentially of 100 parts by weight of at least one ionomer resin and from about 25 to about 100 parts by weight of a metal stearate, wherein said ionomer resin is the reaction product of an olefin having 2 to 8 carbon atoms and an unsaturated monocarboxylic acid having 3 to 8 carbon atoms.

U.S. Pat. No. 5,312,857 discloses a golf ball comprising a core and a cover, wherein the cover consists essentially of 100 parts by weight of at least one ionomer resin and from about 25 to about 100 parts by weight of a fatty acid metal salt, wherein said ionomer resin is the reaction product of an olefin having 2 to 8 carbon atoms and an unsaturated monocarboxylic acid having 3 to 8 carbon atoms.

Japanese Patent Publication No. H06-292740 A discloses a composition for a golf ball cover material which comprises (A) 15 to 90 parts by weight of metal salts of an ethylene/unsaturated carboxylic acid copolymer having an unsaturated carboxylic acid content of 10 to 30% by weight and a degree of neutralization of at least of 25 mole % and (B) 85 to 10 parts by weight of an ethylene/(meth)acrylate ester/unsaturated carboxylic acid terpolymer having a (meth)acrylate ester content of 12 to 45% by weight and an unsaturated carboxylic acid content of 0.5 to 5% by weight.

Japanese Patent Publication No. 2001-218873 A discloses a multi-piece golf ball comprising a solid core, an intermediate layer enclosing the solid core, and a cover enclosing the intermediate layer, wherein at least one of said intermediate layer and said cover is formed of a heated mixture comprising (a) 100 parts by weight of an olefin-unsaturated carboxylic acid random copolymer or an olefin-unsaturated carboxylic acid-unsaturated carboxylate random copolymer or both of them, (b) 5 to 80 parts by weight of a fatty acid having a molecular weight of at least 280 or a derivative thereof, and (c) 0.1 to 10 parts by weight of a basic inorganic metal compound capable of neutralizing acid groups in components (a) and (b), said heated mixture having a melt index of at least 1.0 dg/min, and wherein said intermediate layer has a Shore D hardness of 40 to 63, said cover has a Shore D hardness of 45 to 68, and the Shore D hardness of said solid core at its center is not greater than the Shore D hardness of said intermediate layer, which is not greater than the Shore D hardness of said cover.

Japanese Patent Publication No. 2002-219195 A discloses a golf ball material comprising a mixture which is composed of essential components: 100 pars by weight of a resinous component consisting of a base resin and (e) a non-ionomer thermoplastic elastomer, the base resin and the elastomer being blended in a weight ratio of 100:0 to 50:50; (c) 5 to 80 parts by weight of a fatty acid and/or fatty acid derivative having a molecular weight of 280 to 1,500; and (d) 0.1 to 10 parts by weight of a basic inorganic metal compound capable of neutralizing acidic groups left unneutralized in the base resin and component (c), wherein the base resin has (a) an olefin-unsaturated carboxylic acid binary random copolymer and/or a metal ion-neutralized olefin-unsaturated carboxylic acid binary random copolymer, blended with (b) an olefin-unsaturated carboxylic acid-unsaturated carboxylate ternary random copolymer and/or a metal ion neutralized olefin-unsaturated carboxylic acid-unsaturated carboxylate ternary random copolymer, in a weight ratio of 100:0 to 25:75.

Japanese Patent Publication No. 2004-524418 A discloses a soft and resilient golf ball ethylene copolymer. The ethylene copolymer is a thermoplastic composition comprising E/X/Y copolymers (where E is ethylene, X is a $C_3$ to $C_8$ $\alpha,\beta$ ethylenically unsaturated carboxylic acid, and Y is a softening comonomer selected from alkyl acrylate and alkyl methacrylate wherein the alkyl groups have from 1-8 carbon atoms), wherein a. the E/X/Y copolymer has a melt index measured in accord with ASTM D-1238, condition E, at 190° C. using a 2160 gram weight of at least 75 grams per ten minutes, b. X is about 2-30 wt. % of the E/X/Y copolymer and Y being about 17-40 wt. % of the E/X/Y copolymer, and c. at least 55% of X is neutralized by one or more alkali metal, transition metal, or an alkaline earth metal cations.

Japanese Patent Publication No. 2005-230454 A discloses a golf ball having a cover where a cover composition constituting the cover contains a crystalline thermoplastic resin and an organic nucleating agent having a melting point of 250° C. or more.

SUMMARY OF THE INVENTION

Golf balls using ionomer resins with a high stiffness exhibit an excellent resilience, but tend to provide a poor shot feeling. An approach to employ a soft ternary ionomer resin for a cover of the golf ball has been studied in order to improve the shot feeling. However, use of the soft ternary ionomer resin lowers the resilience of the obtained golf ball. That is, it is an extremely difficult problem to be solved to strike a balance between resilience and shot feeling in a golf ball resin composition using ionomer resins.

The present invention has been achieved in view of the above circumstances. An object of the present invention is to provide a soft golf ball resin composition with an excellent resilience. Another object of the present invention is to provide a golf ball with an excellent shot feeling and resilience.

The present invention that has solved the above problem provides a golf ball resin composition comprising: (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms, (B) 1 part to 25 parts by mass of a phosphate ester and/or a salt thereof; and (C) 0 part to 200 parts by mass of a basic inorganic metal compound. The reasons why the golf ball resin composition of the present invention is soft and excellent in resilience are considered as follows. When the phosphate ester and/or the salt thereof is added to an ionomer resin, it is conceivable that the phosphate ester and/or the salt thereof is taken in an ion association of the ionomer resin, (I) to finely disperse the ion association and inhibit crystallization of ethylene chains, and (II) to weaken constraining of main chains by the ion association. With these actions, the mobility of a molecule chain in the ionomer resin increases, and the resilience of the composition increases while maintaining the flexibility thereof. Furthermore, since constraining of main chains by the ion association weakens, the fluidity of the composition also improves. (C) The basic inorganic metal compound is used to neutralize an unneutralized carboxyl group of (A) the resin component where necessary.

According to the present invention, the soft golf ball resin composition with an excellent resilience is obtained. Use of the golf ball resin composition of the present invention provides a golf ball with an excellent shot feeling and resilience.

DESCRIPTION OF THE PREFERRED EMBODIMENT

Figure 1:
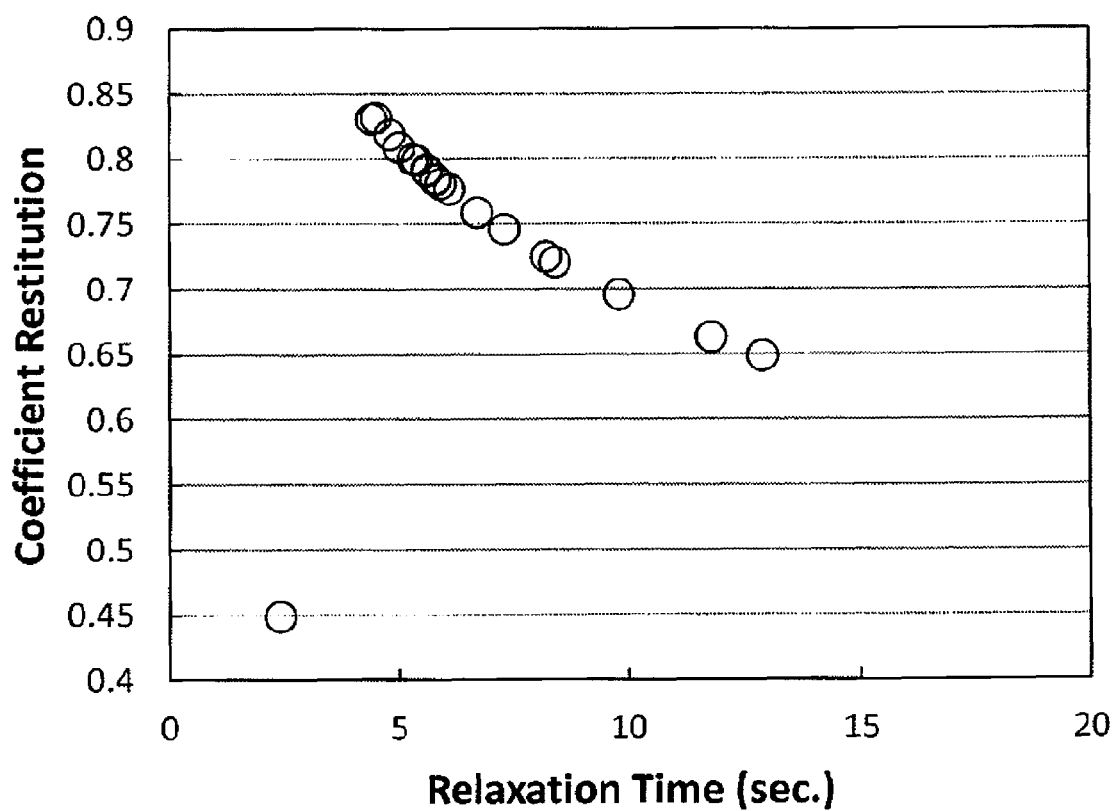
FIG. 1 is a graph showing a relation between coefficient of restitution and the spin-lattice relaxation time (T1) of $^{13}C$ nucleus measured by a high resolution solid state carbon nuclear magnetic resonance (NMR) method.

The golf ball resin composition of the present invention comprises: (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms, (B) 1 part to 25 parts by mass of a phosphate ester and/or a salt thereof; and (C) 0 part to 200 parts by mass of a basic inorganic metal compound.

First, (A) at least one resin component selected from the group consisting of (a-1) a binary copolymer composed of an olefin and an α,β-unsaturated carboxylic acid having 3 to 8 carbon atoms, (a-2) an ionomer resin consisting of a metal ion-neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester will be explained.

(a-1) component is a nonionic binary copolymer composed of an olefin and an α,β-unsaturated carboxylic acid having 3 to 8 carbon atoms wherein the carboxyl groups thereof are not neutralized. Further, (a-2) component includes an ionomer resin prepared by neutralizing at least a part of carboxyl groups in the binary copolymer composed of an olefin and α,β-unsaturated carboxylic acid having 3 to 8 carbon atoms with a metal ion.

(a-3) component is a nonionic ternary copolymer composed of an olefin, an α,β-unsaturated carboxylic acid having 3 to 8 carbon atoms, and an α,β-unsaturated carboxylic acid ester wherein the carboxyl groups thereof are not neutralized. (a-4) component includes an ionomer resin prepared by neutralizing at least a part of carboxyl groups in the ternary copolymer composed of an olefin and an α,β-unsaturated carboxylic acid having 3 to 8 carbon atoms, and an α,β-unsaturated carboxylic acid ester with a metal ion.

In the present invention, "(a-1) the binary copolymer composed of an olefin and an α,β-unsaturated carboxylic acid having 3 to 8 carbon atoms" is sometimes merely referred to as "binary copolymer". "(a-2) The ionomer resin consisting of a metal ion-neutralized product of a binary copolymer composed of an olefin and an α,β-unsaturated carboxylic acid having 3 to 8 carbon atoms" is sometimes referred to as "the binary ionomer resin". "(a-3) The ternary copolymer composed of an olefin, an α,β-unsaturated carboxylic acid having 3 to 8 carbon atoms, and an α,β-unsaturated carboxylic acid ester" is sometimes merely referred to as "ternary copolymer". "(a-4) The ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester" is sometimes referred to as "the ternary ionomer resin".

The olefin preferably includes an olefin having 2 to 8 carbon atoms. Examples of the olefin, for example, are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable.

(a-1) The binary copolymer preferably includes a binary copolymer composed of ethylene and (meth)acrylic acid. (a-2) The binary ionomer resin preferably includes the metal ion-neutralized product of the binary copolymer composed of ethylene-(meth)acrylic acid. (a-3) The ternary copolymer preferably includes a ternary copolymer composed of ethylene, (meth)acrylic acid, and (meth)acrylic acid ester. (a-4) The ternary ionomer resin preferably includes the metal ion-neutralized product of the ternary copolymer composed of ethylene, (meth)acrylic acid, and (meth)acrylic acid ester. Herein, (meth)acrylic acid means acrylic acid and/or methacrylic acid.

The content of the $\alpha,\beta$-unsaturated carboxylic acid having 3 to 8 carbon atoms component in (a-1) the binary copolymer or (a-3) the ternary copolymer is preferably 4 mass % or more, more preferably 5 mass % or more, and is preferably 30 mass % or less, more preferably 25 mass % or less.

The melt flow rate (190° C., 2.16 kg) of (a-1) the binary copolymer or (a-3) the ternary copolymer is preferably 5 g/10 min or more, more preferably 10 g/10 min or more, and even more preferably 15 g/10 min or more, and is preferably 1,700 g/10 min or less, more preferably 1,500 g/10 min or less, even more preferably 1,300 g/10 min or less. If the melt flow rate (190° C., 2.16 kg) of (a-1) the binary copolymer or (a-3) the ternary copolymer is 5 g/10 min or more, the golf ball resin composition has better fluidity, and thus it is easier to mold a constituent member. If the melt flow rate (190° C., 2.16 kg) of (a-1) the binary copolymer or (a-3) the ternary copolymer is 1,700 g/10 min or less, the resultant golf ball has better durability.

Specific examples of (a-1) the binary copolymer include an ethylene-methacrylic acid copolymer such as "NUCREL (registered trademark) (e.g. NUCREL N1050H, NUCREL N2050H, NUCREL N1110H, NUCREL N0200H) manufactured by Du Pont-Mitsui Polychemicals Co, and an ethylene-acrylic acid copolymer such as "PRIMACORE (registered trademark) 5980I" available from Dow Chemical Company.

Specific examples of (a-3) the ternary copolymer include "NUCREL (registered trademark) (e.g. NUCREL AN4318, NUCREL AN4319) manufactured by Du Pont-Mitsui Polychemicals Co, and "NUCREL (registered trademark) (e.g. NUCREL AE) manufactured by E.I. du Pont de Nemours and Company, and "PRIMACORE (registered trademark) (e.g. PRIMCOR AT310, PRIMCOR AT320) available from Dow Chemical Company. (a-1) The binary copolymer or (a-3) the ternary copolymer may be used alone or as a mixture of at least two of them.

The content of the $\alpha,\beta$-unsaturated carboxylic acid having 3 to 8 carbon atoms of (a-2) the binary ionomer resin is preferably 15 mass % or more, more preferably 16 mass % or more, and even more preferably 17 mass % or more, and is preferably 30 mass % or less, more preferably 25 mass % or less. If the content of the $\alpha,\beta$-unsaturated carboxylic acid having 3 to 8 carbon atoms is 15 mass % or more, the resultant constituent member has a desirable hardness. If the content of the $\alpha,\beta$-unsaturated carboxylic acid having 3 to 8 carbon atoms is 30 mass % or less, since the hardness of the resultant constituent member does not become excessively high, the durability and shot feeling become better.

Examples of a metal ion used for neutralizing at least a part of carboxyl groups of (a-2) the binary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like.

Specific examples of (a-2) the binary ionomer resin include trade name "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn))" commercially available from Du Pont-Mitsui Polychemicals Co., Ltd.

Further, examples include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" commercially available from E.I. du Pont de Nemours and Company.

Further, examples include "Iotek (registered trademark) (e.g. Iotek 8000 (Na), Iotek 8030 (Na), Iotek 7010 (Zn), Iotek 7030 (Zn))" commercially available from ExxonMobil Chemical Corporation.

(a-2) The binary ionomer resins may be used alone or as a mixture of at least two of them. It is noted that Na, Zn, Li, and Mg described in the parentheses after the trade names indicate metal types of neutralizing metal ions of the binary ionomer resins.

(a-2) The binary ionomer resin preferably has a bending stiffness of 140 KPa or more, more preferably 150 KPa or more, and even more preferably 160 KPa or more, and preferably has a bending stiffness of 550 MPa or less, more preferably 500 MPa or less, even more preferably 450 MPa or less. If the bending stiffness of (a-2) the binary ionomer resin is too low, the flight distance tends to be shorter because of the increased spin rate of the golf ball. If the bending stiffness is too high, the durability of the golf ball may be lowered.

(a-2) The binary ionomer resin preferably has the melt flow rate (190° C., 2.16 kg) of 0.1 g/10 min or more, more preferably 0.5 g/10 min or more, and even more preferably 1.0 g/10 min or more, and preferably has the melt flow rate (190° C., 2.16 kg) of 30 g/10 min or less, more preferably 20 g/10 min or less, and even more preferably 15 g/10 min or less. If the melt flow rate of (a-2) the binary ionomer resin is 0.1 g/10 min or more, the golf ball resin composition has better fluidity and thus it is easy to mold the thin layer. If the melt flow rate of (a-2) the binary ionomer resin is 30 g/10 min or less, the durability of the resultant golf ball becomes better.

(a-2) The binary ionomer resin preferably has a slab hardness of 10 or more, more preferably 15 or more, even more preferably 20 or more, and preferably has a slab hardness of 75 or less, more preferably 73 or less, even more preferably 70 or less in Shore D hardness. If the binary ionomer resin has a slab hardness of 10 or more in Shore D hardness, the resultant constituent member has a high hardness. If the binary ionomer resin has a slab hardness of 75 or less in Shore D hardness, the resultant constituent member does not become excessively hard and thus the obtained golf ball has better durability.

The content of the $\alpha,\beta$-unsaturated carboxylic acid having 3 to 8 carbon atoms component in (a-4) the ternary ionomer resin is preferably 2 mass % or more, more preferably 3 mass % or more, and is preferably 30 mass % or less, more preferably 25 mass % or less.

Examples of a metal ion used for neutralizing at least a part of carboxyl groups of (a-4) the ternary ionomer resin include: monovalent metal ions such as sodium, potassium, lithium, or the like; divalent metals ions such as magnesium, calcium, zinc, barium, cadmium, or the like; trivalent metals ions such as aluminum or the like; and other metals ions such as tin, zirconium, or the like. As (a-4) the ternary ionomer resin, the ternary ionomer resin neutralized with a magnesium ion is preferred. Neutralizing with the magnesium improves the rebound resilience of (a-4) the ternary ionomer resin.

Specific examples of (a-4) the ternary ionomer resin include trade name "Himilan (registered trademark) (e.g. Himilan AM7327 (Zn), Himilan 1855 (Zn), Himilan 1856 (Na), Himilan AM7331 (Na), or the like)" commercially available from Du Pont-Mitsui Polychemicals Co., Ltd. Further, the ternary ionomer resins commercially available from E.I. du Pont de Nemours and Company include trade name "Surlyn (registered trademark) (e.g. Surlyn 6320 (Mg), Surlyn 8120 (Na), Surlyn 8320 (Na), Surlyn 9320 (Zn), Surlyn 9320W (Zn) or the like)". The ionomer resins commercially available from ExxonMobil Chemical Corporation include trade name "Iotek (registered trademark) (e.g. Iotek 7510 (Zn), Iotek 7520 (Zn) or the like)". It is noted that Na, Zn, Li, and Mg described in the parentheses after the trade names indicate metal types of neutralizing metal ions. (a-4) The ternary ionomer resins may be used alone or as a mixture of at least two of them.

(a-4) The ternary ionomer resin preferably has a bending stiffness of 10 KPa or more, more preferably 11 KPa or more, even more preferably 12 KPa or more, and preferably has a bending stiffness of 100 MPa or less, more preferably 97 MPa or less, even more preferably 95 MPa or less. If the bending stiffness of (a-4) the ternary ionomer resin is too low, the flight distance tends to be shorter because of the increased spin rate of the golf ball. If the bending stiffness is too high, the durability of the golf ball may be lowered.

(a-4) The ternary ionomer resin preferably has the melt flow rate (190° C., 2.16 kg) of 0.1 g/10 min or more, more preferably 0.3 g/10 min or more, and even more preferably 0.5 g/10 min or more, and preferably has the melt flow rate (190° C., 2.16 kg) of 20 g/10 min or less, more preferably 15 g/10 min or less, even more preferably 10 g/10 min or less. If the melt flow rate (190° C., 2.16 kg) of (a-4) the ternary ionomer resin is 0.1 g/10 min or more, the golf ball resin composition has better fluidity and thus it is easy to mold a thin layer. If the melt flow rate (190° C., 2.16 kg) of (a-4) the ternary ionomer resin is 20 g/10 min or less, the durability of the resultant golf ball becomes better.

(a-4) The ternary ionomer resin preferably has a slab hardness of 1 or more, more preferably 3 or more, even more preferably 5 or more, and preferably has a slab hardness of 70 or less, more preferably 65 or less, even more preferably 60 or less in Shore D hardness. If the ternary ionomer resin has a slab hardness of 1 or more in Shore D hardness, the resultant constituent member does not become excessively soft and thus the golf ball has higher resilience. If the ternary ionomer resin has a slab hardness of 70 or less in Shore D hardness, the resultant constituent member does not become excessively hard and thus the golf ball has better durability.

The golf ball resin composition of the present invention preferably contains, as (A) the resin component, (a-3) the ternary copolymer or (a-4) the ternary ionomer resin. This is because the obtained constituent member does not become too hard and the resilience thereof increases.

Next, (B) the phosphate ester and/or the salt thereof used in the present invention will be described. There is no particular limitation on the phosphate ester, as long as it is an ester of a phosphoric acid ($H_3PO_4$). Examples of the phosphate ester include phosphate monoester, phosphate diester, phosphate triester, and the like. Examples of the salt of the phosphate ester include: alkali metal salts such as sodium salt, potassium salt or the like; divalent metals salts such as magnesium salt, calcium salt or the like; and ammonium salts of ammonia, triethanolamine or the like. The phosphate ester may form a salt within a molecule thereof.

As (B) the phosphate ester and/or the salt thereof used in the present invention, a phospholipid and/or a derivative thereof is preferred, and a phosphoglyceride and/or a derivative thereof is more preferred. Examples of the phosphoglyceride include, for example, monoacylglycerol phosphate, diacylglycerol phosphate, or a derivative thereof. Since the phosphoglyceride has a phosphate ester or an inner salt of the phosphate ester where the ionic character is higher than that of a fatty acid as a partial structure, the phosphoglyceride is easily taken in the ion association of the ionomer resin, and since the phosphoglyceride has one or two long alkyl chain group, the phosphoglyceride has an excellent compatibility with the ionomer resin. The monoacylglycerol phosphate and/or the derivative thereof includes a lysophosphatidic acid and/or a derivative thereof represented by the following general formula (1). As the diacylglycerol phosphate and/or the derivative thereof, a phosphatidic acid and/or a derivative thereof represented by the following general formula (2) is preferred.

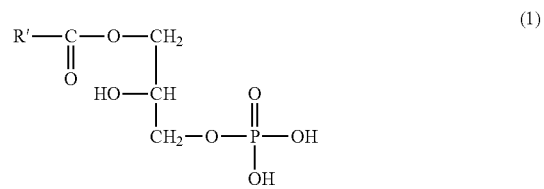

(wherein R' represents a hydrocarbon portion of a fatty acid)

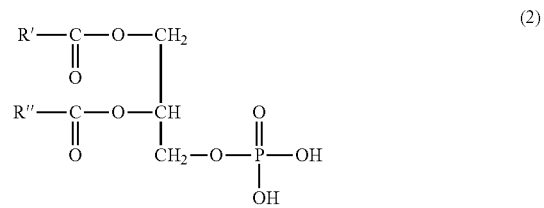

(wherein R' and R" may be identical or different each other, and represent a hydrocarbon portion of a fatty acid)

As shown in the above formula (1), a lysophosphatidic acid has a structure where a fatty acid bonds to the C1 position of the glycerin and a phosphoric acid bonds to C3 position of the glycerin. As shown in the above formula (2), a phosphatidic acid has a structure where fatty acids bond to C1 and C2 positions of the glycerin and a phosphoric acid bonds to C3 position of the glycerin. In the formulae, R' and R" represent a hydrocarbon portion of a fatty acid. The fatty acid may be either a saturated fatty acid or an unsaturated fatty acid. Specific examples of the fatty acid include, for example, butyric acid (C4), valeric acid (C5), caproic acid (C6), enanthic acid (C7), caprylic acid (C8), pelargonic acid (C9), capric acid (decane acid) (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30).

The derivative of the lysophosphatidic acid preferably includes lysophosphatidylcholine, lysophosphatidylethanolamine, lysophosphatidylserine, lysophosphatidylinositol, lysophosphatidylglycerol, and the like.

The derivative of the phosphatidic acid preferably includes an ester of a phosphatidic acid such as phosphatidylcholine represented by the following formula (3), phosphatidylethanolamine represented by the following formula (4), phosphatidylserine, phosphatidylinositol represented by the following formula (5), phosphatidylglycerol or diphosphatidylglycerol.

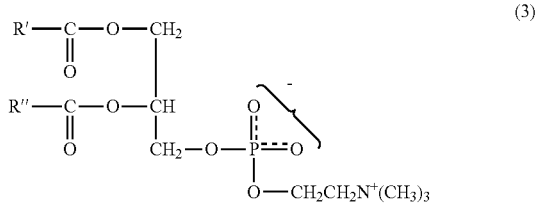

(3)

-continued

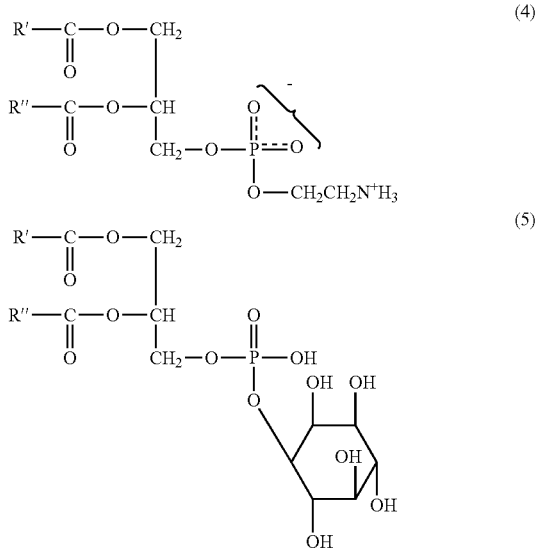

(In the formulae (3) to (5), wherein R' and R" may be identical or different each other, and represent a hydrocarbon portion of a fatty acid)

In the present invention, as the phosphatidic acid and/or the derivative thereof, lecithin may be preferably used. The lecithin means phosphatidylcholine in a narrow sense, but in a broad sense, the lecithin means a mixture of the phosphatidic acids and/or the derivatives thereof. In the present invention, the lecithin in the broad sense is preferred, and a soy lecithin is particularly preferred. The soy lecithin is manufactured by drying and refining an oil cake obtained in a degumming step during the process for purification of the soy oil. The composition of the phospholipids of the lecithin may be varied by fractionating, column chromatography, adsorption or the like. In the present invention, as the lecithin, a mixture of the phosphatidic acid, phosphatidylcholine, phosphatidylethanolamine, phosphatidylinositol, and lysophosphatidylcholine may be preferably used.

Specific examples of (B) the phosphate ester and/or the salt thereof used in the present invention include, for example, "SLP-white (high purity powder lecithin)", "SLP-PC70 (solid PC (phosphatidylcholine) fractionated lecithin), "SLP-PI powder (powder PE (phosphatidylethanolamine, PI (phosphatidylinositol) fractionated lecithin)", "SLP-pastelyso (liquid lysolecithin)", "SLP-whitelyso (high purity powder lysolecithin)", and "SLP-LPC70 (LPC condensed lysolecithin) available from Tsuji Oil Mills Co., Ltd. Each component composition of the phospholipids is shown in Table 1.

TABLE 1

|  | SLP-White | SLP-PC70 | SLP-PI powder | SLP-pastelyso | SLP-whitelyso | SLP-LPC70 |
| --- | --- | --- | --- | --- | --- | --- |
| Content of phospholipids | 96-98 | 90-94 | 90-95 | 40-50 | 95-98 | 90-95 |
| Phosphatidylcholine (PC) | 24-32 | 65-75 | 15-22 | 2-8 | 2-8 | 1-5 |
| Phosphatidylethanolamine (PE) | 20-26 | 10-15 | 25-32 | 1-7 | 1-7 | 0-3 |
| Phosphatidylinositol (PI) | 12-20 | 0-1 | 18-25 | 10-20 | 10-20 | 0-1 |
| Phosphatidic acid (PA) | 8-15 | 1-3 | 8-15 | 0-5 | 0-5 | 0-3 |
| Lysophosphatidylcholine (LPC) | 1-5 | 1-5 | 1-5 | 18-30 | 18-30 | 65-75 |

Unit: mass % (Methods for the Analysis of Fats, Oils and Related Materials)

The content of (B) the phosphate ester and/or the salt thereof is preferably 1 part by mass or more, more preferably 2 parts by mass or more, even more preferably 3 parts by mass or more, and is preferably 25 parts by mass or less, more preferably 20 parts by mass or less, and even more preferably 15 parts by mass or less with respect to 100 parts by mass of (A) the resin component. If the content of (B) the phosphate ester and/or the salt thereof falls within the above range, (B) the phosphate ester and/or the salt thereof is easily taken in an ion association of the ionomer resin and the mobility of a molecule chain in the ionomer resin increases, thereby increasing the resilience while maintaining the flexibility.

The golf ball resin composition of the present invention may further contain (C) the basic inorganic metal compound. (C) The basic inorganic metal compound is added to neutralize an unneutralized carboxyl group of (A) the resin component where necessary. In case of containing only (a-1) the binary copolymer composed of an olefin and an α,β-unsaturated carboxylic acid having 3 to 8 carbon atoms and/or (a-3) the ternary copolymer composed of an olefin an α,β-unsaturated carboxylic acid having 3 to 8 carbon atoms and an α,β-unsaturated carboxylic acid ester as (A) the resin component, (C) the basic inorganic metal compound is an essential component to neutralize the unneutralized carboxyl group of (A) the resin component. On the other hand, in case of containing (a-2) the ionomer resin consisting of a metal ion-neutralized product of a binary copolymer composed of an olefin and an α,β-unsaturated carboxylic acid having 3 to 8 carbon atoms and/or (a-4) the ionomer resin consisting of a metal ion-neutralized product of a ternary copolymer composed of an olefin, an α,β-unsaturated carboxylic acid having 3 to 8 carbon atoms, and an α,β-unsaturated carboxylic acid ester as (A) the resin component, (C) the basic inorganic metal compound may be added to neutralize an unneutralized carboxyl group where necessary.

(C) The basic inorganic metal compound includes elemental metals such as sodium, lithium, potassium, calcium, and magnesium; metal hydroxides such as magnesium hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, calcium carbonate, sodium carbonate, lithium carbonate, and potassium carbonate. (C) The basic inorganic metal compound may be used alone or in combination of two or more of them. Among those, a basic magnesium compound is preferred as (C) the basic inorganic metal compound. Use of the basic magnesium compound provides the obtained golf ball resin composition with the higher rebound resilience.

The content of (C) the basic inorganic metal compound is preferably 0 part by mass or more, and more preferably 1 part by mass or more, and is preferably 200 parts by mass or less, more preferably 100 parts by mass or less, and even more preferably 70 parts by mass or less with respect to 100 parts by mass of (A) the resin component. If the content of (C) the basic inorganic metal compound is too small, the amount of ion association becomes small and the resilience of the composition becomes low. On the other hand, if the content is too large, there may be cases where the ion association does not disperse finely and the resilience of the composition becomes low.

The total neutralization degree in the golf ball resin composition of the present invention is preferably 53% or higher, more preferably 60% or higher, even more preferably 80% or higher, and is preferably 1,000% or lower, more preferably 700% or lower, and even more preferably 400% or lower. If the total neutralization degree is 53% or higher, the amount of ion associations becomes large and the resilience of the composition becomes high, while if the total neutralization degree is 400% or lower, the basic inorganic metal compound disperses homogenously and the durability of the composition improves. The total neutralization degree is defined by the expression below.

> Total Neutralization Degree (%)=100×[number of moles of a cation component in (A) the resin component×valence of the cation component+number of moles of a cation component in (B) the phosphate ester and/or the salt thereof×valence of the cation component+number of moles of a metal component in (C) the basic inorganic metal compound×valence of the metal component]/[number of moles of the carboxyl group in (A) the resin component+number of moles of an anion-forming group in (B) the phosphate ester and/or the salt thereof×valence of the anion-forming group]

The cation components, metal components, carboxyl groups and anion-forming groups include the number of moles of unionized precursor. The content of the cation components and anion components, for example, may be calculated by neutralization titration.

The golf ball resin composition of the present invention preferably contains only (A) the resin component as a base resin component. However, the golf ball resin composition may further contain a thermoplastic elastomer and a thermoplastic resin as long as they do not impair the effect of the present invention.

Examples of other thermoplastic elastomers are a thermoplastic polyamide elastomer having a commercial name of "Pebax (e.g. "Pebax 2533")" commercially available from Arkema K. K.; a thermoplastic polyurethane elastomer having a commercial name of "Elastollan (e.g. "Elastollan XNY85A")" commercially available from BASF Japan Ltd; a thermoplastic polyester elastomer having a commercial name of "Hytrel (e.g. "Hytrel 3548", "Hytrel 4047")" commercially available from Du Pont-Toray Co., Ltd.; a thermoplastic styrene elastomer having a commercial name of "Rabalon (e.g. "Rabalon T3221C")" commercially available from Mitsubishi Chemical Corporation; and the like.

In the present invention, the golf ball resin composition may further contain a pigment component such as a white pigment (for example, titanium oxide) and a blue pigment, a weight adjusting agent, a dispersant, an antioxidant, an ultraviolet absorber, a light stabilizer, a fluorescent material, a fluorescent brightener, and the like, as long as they do not impair the effect of the present invention.

The amount of the white pigment (for example, titanium oxide) is preferably 0.5 part or more, more preferably 1 part or more, and is preferably 10 parts or less, more preferably 8 parts or less, with respect to 100 parts of the resin component by mass. If the amount of the white pigment is 0.5 part by mass or more, it is possible to impart the opacity to the resultant golf ball constituent member. Further, if the amount of the white pigment is more than 10 parts by mass, the durability of the resultant golf ball may deteriorate.

The golf ball resin composition of the present invention can be obtained, for example, by dry blending (A) component, (B) component, and if necessary, (C) component. Further, the dry blended mixture may be extruded in the form of pellet. The dry blending may be carried out using for example, a mixer capable of blending a raw material in the form of pellet, more preferably a tumbler type mixer. Extruding can be carried out by publicly known extruders such as a single-screw kneading extruder, a twin-screw kneading extruder, and a twin-single kneading extruder.

The golf ball resin composition of the present invention preferably has a spin-lattice relaxation time (T1) of $^{13}$C nucleus measured by a high resolution solid state carbon nuclear magnetic resonance (NMR) method of 9.5 seconds or shorter, more preferably 8 seconds or shorter, even more preferably 7 seconds or shorter, and most preferably 6 seconds or shorter. When the decay of the magnetization was measured by the spin-lattice relaxation time (T1) of $^{13}$C nucleus measured by a high resolution solid state carbon nuclear magnetic resonance (NMR) method on ionomer resins, the obtained relaxation time (T1) is thought to be caused by trans conformation of ethylene chains. The present inventors predicted that ethylene crystals and ethylene chain-constraining layers surrounding the ion association exist as a part where the trans conformation can possibly occur, and that a relaxation component in measurement of magnetization decay can be separated into a short-time component and a long-time component. Then, the present inventors have found that the ethylene chain-constraining layers correlate with resilience. More specifically, when the relaxation time (T1) becomes shorter, the mobility of the ethylene chain-constraining layers becomes higher and the resilience improves. Thus, the golf ball resin composition preferably has a spin-lattice relaxation time (T1) of $^{13}$C nucleus measured by a high resolution solid state carbon nuclear magnetic resonance (NMR) method of 9.5 seconds or shorter, more preferably 8 seconds or shorter, even more preferably 7 seconds or shorter, and most preferably 6 seconds or shorter.

Furthermore, with regard to the golf ball resin composition of the present invention, when measurement is conducted by using a dynamic viscoelasticity device in a tensile mode with a condition of oscillation frequency of 10 Hz, temperature of 12° C., and measurement strain of 0.05%, the storage modulus E' (Pa) and the loss modulus E" (Pa) preferably satisfy the formula below. By satisfying the formula below, the golf ball resin composition will have a high resilience while maintaining the flexibility at a high level. It should be noted that log in the formula below is common logarithm.

$$\log(E'/E''^2) \geq -6.23$$

It is thought that the resilience of the composition becomes higher as the storage modulus E' (Pa) becomes larger, or as the loss modulus E" (Pa) becomes smaller. In addition, hardness also increases as the storage modulus E' (Pa) becomes larger. In the above described formula, since the denominator is the second power of the loss modulus E" whereas the numerator is the first power of the storage elastic modulus E', the above described formula means that reducing the loss modulus E" has a larger improvement effect on the resilience than increasing the storage modulus E' to enhance the hardness. Log(E'/E"$^2$) is preferably −6.02 or more, more preferably −5.93 or more, and even more preferably −5.89 or more. Further, log (E'/E"$^2$) is, but not limited to, preferably −5.25 or less, more preferably −5.40 or less, because when the log(E'/E"$^2$) is −5.25, the coefficient of Restitution almost reaches the maximum value of 1. The reasons of employing the measurement conditions of the oscillation frequency: 10 Hz, the temperature: 12° C. as the conditions of measuring the dynamic viscoelasticity are follows. The contact time between the golf ball and a collision bar (cylindrical metallic material) is 500 micro seconds in measuring coefficient of restitution at 40 m/s. If this is considered as a deformation of one cycle, this deformation corresponds to a deformation at the several thousands Hertz. Based on the frequency and temperature superposition principle of the general ionomer resin, the dynamic viscoelasticity measured at the conditions of temperature: room temperature and oscillation frequency: several thousands Hertz corresponds to the dynamic viscoelasticity measured at the conditions of temperature: 12° C. and oscillation frequency: 10 Hz.

The golf ball resin composition of the present invention preferably has the melt flow rate (190° C., 2.16 kg) of 0.01 g/10 min or more, more preferably 0.05 g/10 min or more, and even more preferably 0.1 g/10 min or more, and preferably has the melt flow rate (190° C., 2.16 kg) of 100 g/10 min or less, more preferably 80 g/10 min or less, and even more preferably 50 g/10 min or less. If the golf ball resin composition has the melt flow rate in the above range, the moldability into the golf ball constituent member is good.

The golf ball resin composition preferably has a bending stiffness of 10 KPa or more, more preferably 15 KPa or more, even more preferably 20 KPa or more, and preferably has a bending stiffness of 450 MPa or less, more preferably 400 MPa or less, even more preferably 350 MPa or less. Use of the golf ball resin composition having a bending stiffness of 10 KPa or more provides the golf ball excellent in the resilience (flying distance). On the other hand, if the bending stiffness is 450 MPa or less, the obtained golf ball becomes appropriately soft and thus the shot feeling becomes good.

The golf ball resin composition of the present invention preferably has a rebound resilience of 40% or more, more preferably 43% or more, even more preferably 46% or more. Use of the golf ball resin composition having a rebound resilience of 40% or more provides the golf ball excellent in the resilience (flying distance). Here, the bending stiffness and the rebound resilience of the golf ball resin composition are measured by molding the golf ball resin composition into a sheet form. The methods for the measurement are described later.

The golf ball resin composition preferably has a slab hardness of 1 or more, more preferably 3 or more, even more preferably 5 or more, and preferably has a slab hardness of 70 or less, more preferably 65 or less, even more preferably 60 or less, most preferably 50 or less in Shore D hardness. Use of the golf ball resin composition having a slab hardness of 1 or more in Shore D hardness provides the golf ball with excellent resilience (flight distance). On the other hand, use of the golf ball resin composition having a slab hardness of 70 or less in Shore D hardness provides the golf ball with excellent durability. Herein, the slab hardness of the golf ball resin composition is a measured hardness of the golf ball resin composition that is molded into a sheet form by a measuring method described later.

The golf ball of the present invention is not limited, as long as it comprises a constituent member formed from the golf ball resin composition of the present invention. For example, in a one-piece golf ball, in a two-piece golf ball comprising a single-layered core and a cover disposed around the core, in a three-piece golf ball comprising a core having a center and a single-layered intermediate layer disposed around the center, and a cover disposed around the core, and in a multi-piece golf ball comprising a core having a center and at least one intermediate layer disposed around the center, and a cover disposed around the core (including the three-piece golf ball mentioned above), any one of constituent members may be formed from the above golf ball resin composition. In one preferable embodiment of the present invention, the golf ball comprises a core composed of at least one layer and a cover disposed around the core, wherein at least one layer of the core is formed from the golf ball resin composition of the present invention. In another preferable embodiment, the golf ball body of the one-piece golf ball is formed from the golf ball resin composition of the present invention. In particular, in one more preferable embodiment, the two-piece golf ball comprises a single-layered core and a cover disposed around the core, wherein the single-layered core is formed from the golf ball resin composition of the present invention. Also, in another more preferable embodiment, the multi-piece golf ball comprises a core having a center and at least one intermediate layer disposed around the center, and a cover disposed around the core, wherein the center is formed from the golf ball resin composition of the present invention.

In the following, the present invention will be explained based on the two-piece golf ball that comprises a core and a cover disposed around the core, wherein the core is formed from the golf ball resin composition of the present invention. However, the present invention is not limited to this embodiment.

The core, for example, is molded by injection molding the golf ball resin composition of the present invention. Specifically, it is preferred that the golf ball resin composition heated and melted at the temperature ranging from 160° C. to 260° C. is charged into a mold held under the pressure of 1 MPa to 100 MPa for 1 second to 100 seconds, and after cooling for 30 seconds to 300 seconds, the mold is opened.

The core preferably has a spherical shape. If the core does not have a spherical shape, the cover does not have a uniform thickness. As a result, there exist some portions where the performance of the cover is lowered.

The core preferably has the diameter of the 39.00 mm or more, more preferably 39.25 mm or more, and even more preferably 39.50 mm or more, and preferably has the diameter of 42.37 mm or less, more preferably 42.22 mm or less, and even more preferably 42.07 mm or less. If the core has the diameter of 39.00 mm or more, the thickness of the cover does not become too thick and thus the resilience becomes better.

On the other hand, if the core has the diameter of 42.37 mm or less, the thickness of the cover does not become too thin, and hence a protection ability of the cover is sufficiently provided.

When the core has a diameter from 39.00 mm to 42.37 mm, a compression deformation amount (shrinking deformation amount of the core along the compression direction) of the core when applying a load from 98 N as an initial load to 1275 N as a final load is preferably 1.00 mm or more, more preferably 1.10 mm or more, and is preferably 5.00 mm or less, more preferably 4.90 mm or less, even more preferably 4.80 mm or less. If the compression deformation amount is 1.00 mm or more, the shot feeling of the golf ball becomes better. If the compression deformation amount is 5.00 mm or less, the resilience of the golf ball becomes better.

The surface hardness of the core is 20 or larger, more preferably 25 or larger, and even more preferably 30 or larger in shore D hardness, and is preferably 70 or smaller, more preferably 69 or smaller in shore D hardness. If the surface hardness is 20 or larger in shore D hardness, the core does not become so soft and the better resilience of the golf ball is obtained. If the surface hardness of the core is 70 or smaller in shore D hardness, the core does not become so hard and the better shot feeling is obtained.

The center hardness of the core is preferably 20 or larger, more preferably 22 or larger, and even more preferably 24 or larger in Shore D hardness. If the center hardness is less than 20 in shore D hardness, the core becomes so soft that the resilience of the golf ball tends to become lower. Further, the center hardness of the core is preferably 50 or smaller, more preferably 48 or smaller, and even more preferably 46 or smaller in Shore D hardness. If the center hardness is more than 50 in shore D hardness, the core becomes too hard, resulting in the poor shot feeling. In the present invention, the center hardness of the core is the hardness measured with the Shore D type spring hardness tester at the central point of a cut plane of a core which has been cut into two halves.

The core preferably contains a filler. The filler is mainly blended as a weight adjusting agent in order to adjust density of the golf ball as the final product within the range of 1.0 to 1.5 g/cm$^3$, and may be blended as required. Examples of the filler include an inorganic filler such as zinc oxide, barium sulfate, calcium carbonate, magnesium oxide, tungsten powder, and molybdenum powder. The amount of the filler to be blended in the resin composition is preferably 0.5 part or more, more preferably 1.0 part or more, and is preferably 30 parts or less, more preferably 20 parts or less with respect to 100 parts by mass of (A) the resin component. If the amount of the filler to be blended is less than 0.5 part by mass, it becomes difficult to adjust the weight, while if it is more than 30 parts by mass, the weight ratio of the resin component becomes small and the resilience tends to be lowered.

The cover of the golf ball of the present invention is preferably formed from a cover composition containing a resin component. The resin component includes, for example, various resins such as an ionomer resin, polyester resin, urethane resins such as a thermoplastic urethane resin or two-component curable urethane resin, polyamide resin or the like; and a thermoplastic polyamide elastomer having a commercial name of "Pebax (registered trademark) (e.g. "Pebax 2533")" commercially available from Arkema K. K.; a thermoplastic polyester elastomer having a commercial name of "Hytrel (registered trademark) (e.g. "Hytrel 3548", "Hytrel 4047")" commercially available from Du Pont-Toray Co., Ltd.; a thermoplastic polyurethane elastomer having a commercial name of "Elastollan (registered trademark) (e.g. "Elastollan XNY97A")" commercially available from BASF Japan Ltd.; a thermoplastic styrene elastomer having a commercial name of "Rabalon (registered trademark)" commercially available from Mitsubishi Chemical Corporation. These resin components are used solely or as a mixture of at least two of them.

The ionomer resin preferably includes the resins exemplified as (a-2) or (a-4) components.

The cover composition preferably contains the polyurethane resin (including polyurethane elastomer) or the ionomer resin, as the resin component. The content of the polyurethane resin or the ionomer resin in the resin component of the cover composition is preferably 50 mass % or more, more preferably 60 mass % or more, even more preferably 70 mass % or more.

In the present invention, in addition to the aforementioned resin component, the cover composition may further contain a pigment component such as a white pigment (for example, titanium oxide), a blue pigment, a red pigment, or the like; a weight adjusting agent such as zinc oxide, calcium carbonate, barium sulfate, or the like; a dispersant; an antioxidant; an ultraviolet absorber; a light stabilizer; a fluorescent material; a fluorescent brightener; or the like, as long as they do not impair the performance of the cover.

The amount of the white pigment (for example, titanium oxide), with respect to 100 parts by mass of the resin component constituting the cover, is preferably 0.5 part by mass or more, more preferably 1 part by mass or more, and is preferably 10 parts by mass or less, more preferably 8 parts by mass or less. If the amount of the white pigment is 0.5 part by mass or more, it is possible to impart the opacity to the cover. If the amount of the white pigment is more than 10 parts by mass, the durability of the resultant cover may deteriorate.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

In the case of directly injection molding the cover composition, the cover composition extruded in the pellet form beforehand may be used for injection molding or the materials such as the resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is taken out from the mold.

When molding a cover, the concave portions called "dimple" are usually formed on the surface. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the thickness of the cover of the golf ball is preferably 2.0 mm or less, more preferably 1.6 mm or less, even more preferably 1.2 mm or less, most preferably 1.0 mm or less. If the thickness of the cover is 2.0 mm or less, the resilience and shot feeling of the obtained golf ball become better. The thickness of the cover is preferably 0.1 mm or more, more preferably 0.2 mm or more, and even more preferably 0.3 mm or more. If the thickness of the cover is less than 0.1 mm, it may become difficult to mold the cover. In addition, the durability and the wear resistance of the cover may deteriorate.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 µm or larger, and more preferably 7 µm or larger, and preferably has a thickness of 25 µm or smaller, and more preferably 18 µm or smaller. If the thickness is smaller than 5 µm, the paint film is easy to wear off due to continued use of the golf ball, and if the thickness is larger than 25 µm, the effect of the dimples is reduced, resulting in lowering flying performance of the golf ball.

When the golf ball has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

The present invention is explained based on the embodiment where the golf ball resin composition of the present invention is used for the core, but the golf ball resin composition of the present invention may be used as the center, the intermediate layers, and the cover. If the center is formed from the golf ball resin composition of the present invention, the intermediate layers may be formed from the resin components exemplified as the cover materials.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Slab Hardness (Shore D Hardness)

Sheets with a thickness of about 2 mm were produced by hot press molding the golf ball resin composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Melt Flow Rate (MFR) (g/10 min)

The MFR was measured using a flow tester (Shimadzu flow tester CFT-100C manufactured by Shimadzu Corporation) in accordance with JIS K7210. The measurement was conducted under the conditions of the measurement temperature 190° C. and the load of 2.16 kg.

(3) Rebound Resilience (%)

A sheet with a thickness of about 2 mm was produced by hot press molding the golf ball resin composition. A circle-shaped test piece having a diameter of 28 mm was cut out of this sheet, and 6 pieces of the test piece were stacked to prepare a cylindrical test piece having a thickness of about 12 mm and a diameter of 28 mm. The cylindrical test piece was subjected to the Lupke type rebound resilience test (testing temperature 23° C., humidity 50RH %). Preparation of the test piece and the testing method are based on JIS K6255.

(4) Compression Deformation Amount (mm)

A compression deformation amount of the spherical body (a shrinking amount of the spherical body in the compression direction thereof), when applying a load from 98 N as an initial load to 1275 N as a final load to the spherical body, was measured. The compression deformation amount of spherical body No. 19 was defined as an index of 1.00 and the compression deformation amount was represented by converting the compression deformation amount of each golf ball into this index.

(5) Coefficient of Restitution

A 198.4 g of metal cylindrical object was forced to collide with each spherical body at a speed of 40 m/sec, and the speeds of the cylindrical object and the spherical body before and after the collision were measured. Based on these speeds and the mass of each object, coefficient of restitution for each spherical body was calculated. The measurement was conducted by using twelve spherical bodies for each spherical body, and the average value was regarded as the coefficient of restitution for the spherical body.

(6) Shot Feeling

An actual hitting test was carried out by ten amateur golfers (high skilled person) using a driver. Feeling at the shot was evaluated by each person according to the following criteria. Major result of the evaluations of ten golfers was employed as the result of the golf ball.

E (Excellent): Impact is small and feeling is good.

G (Good): Normal feeling.

P (Poor): Impact is large and feeling is poor.

(7) Method for Measuring the Spin-Lattice Relaxation Time (T1) of $^{13}C$ Nucleus Measured by a High Resolution Solid State Carbon Nuclear Magnetic Resonance (NMR) Method Apparatus: Bruker Avance 400

Measuring method: Measurement of the relaxation time (T1) by Torcha method

Measurement frequency: 100.6256207 MHz

Measurement temperature: room temperature

Reference material: adamantane

Number of revolutions of magic angle revolution: 5000 Hz

Pulse width: 4.80 micro sec

Contact time: 2000 micro sec

Pulse interval: 1 micro sec, 100 m sec, 500 m sec, 1 sec, 2 sec, 3 sec, 4 sec, 6 sec, 8 sec, 10 sec, 12 sec, 15 sec, 20 sec, 40 sec, 80 sec, 120 sec Magnetic field intensity: 9.4 T
(8) Measurement of Storage Modulus E' (Pa) and Loss Modulus E" (Pa)

The storage modulus E' (Pa) and the loss modulus E" (Pa) of the golf ball resin composition were measured at the following conditions.
Apparatus: Viscoelasticity measuring apparatus Rheogel-E4000 available from UBM CO., Ltd.
Test piece: A sheet having a thickness of 2 mm was produced by press molding the golf ball resin composition and a test piece was cut out to have a width 4 mm and a length between the clamps of 20 mm.
Measuring mode: tensile mode
Measuring temp.: 12° C.
Oscillation frequency: 10 Hz
Measuring strain: 0.05%

[Production of the Spherical Body (Core)]

As shown in Tables 2 to 4, the blending materials were dry blended, followed by mixing with a twin-screw kneading extruder to extrude the blended material in the strand form into the chilled water. The extruded strand was cut with a pelletizer to prepare a golf ball resin composition in the form of pellet. Extrusion was performed in the following conditions: screw diameter=45 mm; screw revolutions=200 rpm; and screw L/D=35. The mixtures were heated to a temperature in a range from 160° C. to 230° C. at a die position of the extruder. The obtained golf ball resin composition in the form of pellet was injection molded at a temperature of 220° C. to prepare a spherical body (core) having a diameter of 40 mm.

TABLE 2

| | | Golf ball resin composition (spherical body) No. | | | | | | | |
|---|---|---|---|---|---|---|---|---|---|
| | | 1 | 2 | 3 | 4 | 5 | 6 | 7 | 8 |
| Formulation | NUCREL AN4319 | 100 | 100 | 100 | 100 | 100 | 100 | 100 | — |
| | SURLYN 6320 | — | — | — | — | — | — | — | 100 |
| | Magnesium hydroxide | 1.6 | 2.2 | 2.7 | 1.6 | 2.2 | 2.7 | 4.3 | 1.5 |
| | Lecithin 1 | 3.0 | 3.0 | 3.0 | 10.0 | 10.0 | 10.0 | 10.0 | 10.0 |
| | Salt of stearic acid | — | — | — | — | — | — | — | — |
| Properties | Total neutralization degree (%) | 61 | 79 | 98 | 61 | 78 | 94 | 144 | 94 |
| | Melt flow rate (g/10 min) | 0.61 | 0.40 | 0.32 | 0.35 | 0.30 | 0.27 | 0.23 | 0.32 |
| | Shore D hardness | 46 | 47 | 48 | 41 | 43 | 45 | 48 | 46 |
| | Rebound resilience (%) | 60 | 62 | 61 | 58 | 59 | 62 | 64 | 63 |
| | Log (E'/E"$^2$) | −5.93 | −5.88 | −5.89 | −6.02 | −5.97 | −5.88 | −5.79 | −5.83 |
| | T1 Relaxation time (sec) | 6.4 | 5.8 | 5.9 | 7.3 | 6.7 | 5.8 | 5.0 | 5.4 |
| | Compression deformation amount | 0.36 | 0.33 | 0.33 | 0.47 | 0.43 | 0.38 | 0.32 | 0.36 |
| | Coefficient of Restitution | 0.769 | 0.784 | 0.781 | 0.746 | 0.759 | 0.785 | 0.809 | 0.799 |
| | Shot feeling | E | E | E | E | E | E | E | E |

Formulation: parts by mass

TABLE 3

| | | Golf ball resin composition (spherical body) No. | | | | | | | | | | |
|---|---|---|---|---|---|---|---|---|---|---|---|---|
| | | 9 | 10 | 11 | 12 | 13 | 14 | 15 | 16 | 17 | 18 | 19 |
| Formulation | NUCREL AN4319 | 100 | 100 | 100 | 100 | 100 | 100 | 100 | 100 | 100 | 100 | 100 |
| | Magnesium hydroxide | 1.6 | 2.2 | 2.7 | 1.6 | 2.2 | 2.7 | 2.2 | 3.7 | 3.5 | 5.8 | — |
| | Lecithin 1 | — | — | — | 30.0 | 30.0 | 30.0 | — | — | — | — | — |
| | Stearic acid | — | — | — | — | — | — | 10.0 | 10.0 | 30.0 | 30.0 | — |
| Properties | Total neutralization degree (%) | 60 | 80 | 100 | 63 | 75 | 87 | 60 | 100 | 60 | 100 | 0 |
| | Melt flow rate (g/10 min) | 3.19 | 1.60 | 1.11 | 0.33 | 0.28 | 0.15 | 5.22 | 2.81 | 11.26 | 6.89 | 65.08 |
| | Shore D hardness | 46 | 49 | 49 | 31 | 27 | 30 | 49 | 53 | 52 | 52 | 32 |
| | Rebound resilience (%) | 56 | 61 | 62 | 50 | 49 | 53 | 56 | 63 | 62 | 66 | 44 |
| | Log (E'/E"$^2$) | −6.09 | −5.91 | −5.85 | −6.31 | −6.37 | −6.20 | −6.11 | −5.82 | −5.85 | 5.71 | −6.55 |
| | T1 Relaxation time (sec) | 8.2 | 6.1 | 5.6 | 11.8 | 12.9 | 9.8 | 8.4 | 5.3 | 5.6 | 4.4 | 2.4 |
| | Compression deformation amount | 0.36 | 0.32 | 0.31 | 0.93 | 1.33 | 0.98 | 0.30 | 0.26 | 0.26 | 0.26 | 1.00 |
| | Coefficient of Restitution | 0.725 | 0.777 | 0.791 | 0.663 | 0.649 | 0.696 | 0.721 | 0.800 | 0.791 | 0.831 | 0.449 |
| | Shot feeling | E | G | G | E | E | E | G | P | P | P | E |

Formulation: parts by mass

TABLE 4

| | | Golf ball resin composition (spherical body) No. | | | | |
|---|---|---|---|---|---|---|
| | | 20 | 21 | 22 | 23 | 24 |
| Formulation | NUCREL AN4319 | 100 | 100 | 100 | 100 | 100 |
| | SURLYN 6320 | — | — | — | — | — |
| | Magnesium hydroxide | 2.2 | 2.7 | 3.3 | 2.2 | 3.3 |
| | Lecithin 2 | 10.0 | 10.0 | 10.0 | — | — |
| | Phosphatidic acid | — | — | — | 10.0 | 10.0 |

TABLE 4-continued

|  |  | Golf ball resin composition (spherical body) No. | | | | |
| --- | --- | --- | --- | --- | --- | --- |
|  |  | 20 | 21 | 22 | 23 | 24 |
| Properties | Total neutralization degree (%) | 82 | 100 | 118 | 61 | 92 |
|  | Melt flow rate (g/10 min) | 0.25 | 0.15 | 0.07 | 0.29 | 0.11 |
|  | Shore D hardness | 43 | 43 | 44 | 48 | 50 |
|  | Rebound resilience (%) | 63 | 66 | 65 | 62 | 63 |
|  | Log (E'/E''$^2$) | −5.83 | −5.72 | −5.76 | −5.86 | −5.83 |
|  | T1 Relaxation time (sec) | 5.4 | 4.5 | 4.8 | 5.6 | 5.3 |
|  | Compression deformation amount | 0.42 | 0.42 | 0.42 | 0.33 | 0.31 |
|  | Coefficient of Restitution | 0.799 | 0.832 | 0.819 | 0.792 | 0.800 |
|  | Shot feeling | E | E | E | E | E |

Formulation: parts by mass

The materials used in Tables 2 to 4 are follows.
"NUCREL AN 4319": an ethylene-methacrylic acid-butyl acrylate ternary copolymer (melt flow rate (190° C., 2.16 kg): 55 g/10 min, bending stiffness: 21 MPa, content of methacrylic acid: 8 mass %) available from Du Pont-Mitsui Polychemicals Co., Ltd.
"SURLYN 6320": Magnesium ion neutralized ethylene-methacrylic acid-butyl acrylate copolymer (melt flow rate (190° C., 2.16 kg): 1 g/10 min, bending stiffness: 53 MPa) available from Du Pont-Mitsui Polychemicals Co., Ltd.
Magnesium Hydroxide Wako Pure Chemical Industries, Ltd.
Lecithin 1: SLP-white (purified soybean lecithin) available from Tsuji Oil Mills Co., Ltd.
Lecithin 2: SLP-PC70 (phosphatidylcholine concentrated soybean lecithin) available from Tsuji Oil Mills Co., Ltd.
Phosphatidic acid: PA NAGASE available from NAGASE & CO., LTD.
Stearic acid: "powder stearic acid Tsubaki" available from NOF CORPORATION As is apparent from Tables 2 to 4, the golf ball resin compositions containing: (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms, (B) 1 part to 25 parts by mass of a phosphate ester and/or a salt thereof; and (C) 0 part to 200 parts by mass of a basic inorganic metal compound had a Shore D hardness of 50 or less and rebound resilience of 58% or more. The result shows that the golf ball resin composition of the present invention is soft and excellent in resilience.

Figure 2:
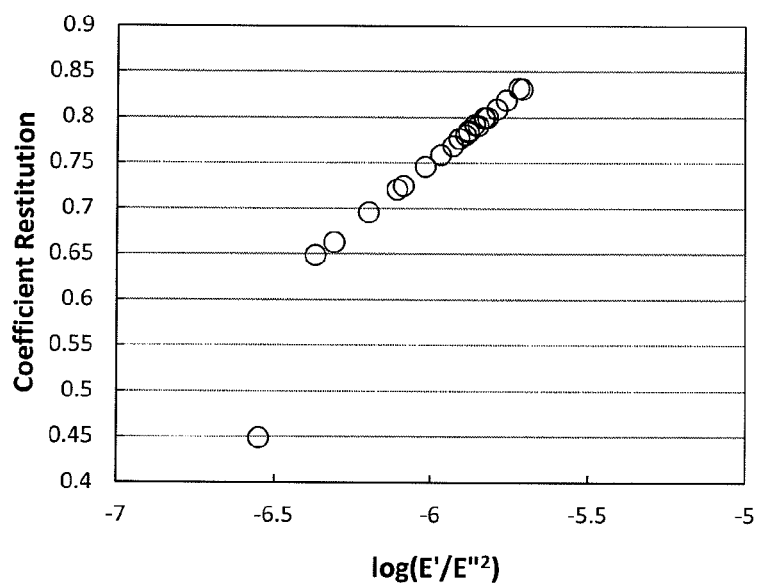
FIG. 2 is a graph showing a relation between coefficient of restitution and $\log(E'/E''^2)$.

FIG. 1 is a graph showing the relation between the coefficient of restitution and relaxation time (T1). The graph shows that as the relaxation time (T1) becomes shorter, the coefficient of restitution becomes higher. In particular, if the relaxation time (T1) is 9.5 seconds or shorter, cores having higher coefficient of restitution are obtained. FIG. 2 is a graph showing the relation between the resilience and log(E'/E''$^2$). The graph shows that as the log(E'/E''$^2$) becomes larger, the coefficient of restitution becomes higher. In particular, when the log (E'/E''$^2$) is −6.23 or more, cores having higher coefficient of restitution are obtained.

According to the present invention, the golf ball excellent in resilience and shot feeling is obtained. This application is based on Japanese Patent applications No. 2011-152216 filed on Jul. 8, 2011 and No. 2011-265617 filed on Dec. 5, 2011, the contents of which are hereby incorporated by reference.

What is claimed is:

1. A golf ball resin composition comprising
   (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid having 3 to 8 carbon atoms and an α,β-unsaturated carboxylic acid ester, and (a-4) an ionomer resin consisting of a metal ion neutralized product of a ternary copolymer composed of an olefin, an α,β-unsaturated carboxylic acid having 3 to 8 carbon atoms and an α,β-unsaturated carboxylic acid ester,
   (B) 1 part to 25 parts by mass of a phosphate ester and/or a salt thereof, and
   (C) 0 part to 200 parts by mass of a basic inorganic metal compound,
   wherein (B) the phosphate ester and/or the salt thereof includes a mixture of a phosphatidic acid, a derivative of the phosphatidic acid, and a derivative of a lysophosphatidic acid.

2. The golf ball resin composition according to claim 1, wherein the derivative of the lysophosphatidic acid includes lysophosphatidylcholine.

3. The golf ball resin composition according to claim 1, wherein (C) the basic inorganic metal compound includes a basic magnesium compound.

4. The golf ball resin composition according to claim 1, wherein (a-4) the ionomer resin neutralized with a magnesium ion is used as (A) the resin component.

5. The golf ball resin composition according to claim 1, wherein the golf ball resin composition has a total neutralization degree represented by a following formula of 53% or more and 1,000% or less:

Total Neutralization Degree (%)=100×[number of moles of a cation component in (A) the resin component×valence of the cation component+number of moles of a cation component in (B) the phosphate ester and/or the salt thereof×valence of the cation component+number of moles of the metal component in (C) the basic inorganic metal compound×valence of the metal component]/[number of moles of the carboxyl group in (A) the resin component+number of moles of an anion-forming group in (B) the phosphate ester and/or the salt thereof x valence of the anion-forming group].

6. The golf ball resin composition according to claim 1, wherein the golf ball resin composition has a slab hardness ranging from 1 to 99 in Shore D hardness.

7. The golf ball resin composition according to claim 1, wherein the golf ball resin composition contains (B) the phosphate ester and/or the salt thereof in a content ranging from 3 parts by mass to 15 parts by mass with respect to 100 parts by mass of (A) the resin component.

8. The golf ball resin composition according to claim 1, wherein the golf ball resin composition is prepared by dry blending (A) the resin component, (B) the phosphate ester and/or the salt thereof, and (C) the basic metal compound if necessary.

9. The golf ball resin composition according to claim 1, wherein the golf ball resin composition has a melt flow rate (190° C., 2.16 kg) of 0.01 g/10 min or more and 0.40 g/10 min or less.

10. A golf ball having a constituent member formed from a golf ball resin composition comprising
  (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms,
  (B) 1 part to 25 parts by mass of a phosphate ester and/or a salt thereof; and
  (C) 0 part to 200 parts by mass of a basic inorganic metal compound,
  wherein (B) the phosphate ester and/or the salt thereof includes a mixture of a phosphatidic acid, a derivative of the phosphatidic acid, and a derivative of a lysophosphatidic acid.

11. The golf ball according to claim 10, wherein the derivative of the lysophosphatidic acid includes lysophosphatidylcholine.

12. The golf ball according to claim 10, wherein the golf ball resin composition has a melt flow rate (190° C., 2.16 kg) of 0.01 g/10 min or more and 0.40 g/10 min or less.

13. A golf ball comprising a core composed of at least one layer and a cover covering the core, wherein at least one layer of the core is formed from a golf ball resin composition comprising
  (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms,
  (B) 1 part to 25 parts by mass of a phosphate ester and/or a salt thereof; and
  (C) 0 part to 200 parts by mass of a basic inorganic metal compound,
  wherein (B) the phosphate ester and/or the salt thereof includes a mixture of a phosphatidic acid, a derivative of the phosphatidic acid, and a derivative of a lysophosphatidic acid.

14. The golf ball according to claim 13, wherein the derivative of the lysophosphatidic acid includes lysophosphatidylcholine.

15. The golf ball according to claim 13, wherein the golf ball resin composition has a melt flow rate (190° C., 2.16 kg) of 0.01 g/10 min or more and 0.40 g/10 min or less.

16. A golf ball comprising a core composed of at least one layer and a cover covering the core, wherein the cover is formed from a golf ball resin composition comprising
  (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms,
  (B) 1 part to 25 parts by mass of a phosphate ester and/or a salt thereof; and
  (C) 0 part to 200 parts by mass of a basic inorganic metal compound,
  wherein (B) the phosphate ester and/or the salt thereof includes a mixture of a phosphatidic acid, a derivative of the phosphatidic acid, and a derivative of a lysophosphatidic acid.

17. The golf ball according to claim 16, wherein the derivative of the lysophosphatidic acid includes lysophosphatidylcholine.

18. A one-piece golf ball comprising a golf ball body formed from a golf ball resin composition comprising
  (A) 100 parts by mass of at least one resin component selected from the group consisting of (a-1) a binary copolymer composed of an olefin and an α,β-unsaturated carboxylic acid having 3 to 8 carbon atoms, (a-2) an ionomer resin consisting of a metal ion neutralized product of a binary copolymer composed of an olefin and an α,β-unsaturated carboxylic acid having 3 to 8 carbon atoms, (a-3) a ternary copolymer composed of an olefin, an α,β-unsaturated carboxylic acid ester, and an α,β-unsaturated carboxylic acid having 3 to 8 carbon atoms, and (a-4) an ionomer resin consisting of a metal ion neutralized product of a ternary copolymer composed of an olefin, an α,β-unsaturated carboxylic acid ester, and an α,β-unsaturated carboxylic acid having 3 to 8 carbon atoms,
  (B) 1 part to 25 parts by mass of a phosphate ester and/or a salt thereof; and
  (C) 0 part to 200 parts by mass of a basic inorganic metal compound, wherein (B) the phosphate ester and/or the salt thereof includes a mixture of a phosphatidic acid, a derivative of the phosphatidic acid, and a derivative of a lysophosphatidic acid.

19. The one-piece golf ball according to claim 18, wherein the derivative of the lysophosphatidic acid includes lysophosphatidylcholine.

\* \* \* \* \*